(12) United States Patent
Plickys et al.

(10) Patent No.: US 9,227,731 B2
(45) Date of Patent: Jan. 5, 2016

(54) ELECTRICAL POWER TRANSFER SYSTEM FOR PROPELLER SYSTEM

(71) Applicants: Mark R. Plickys, Unionville, CT (US); Paul A. Carvalho, Hadley, MA (US)

(72) Inventors: Mark R. Plickys, Unionville, CT (US); Paul A. Carvalho, Hadley, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 500 days.

(21) Appl. No.: 13/685,243

(22) Filed: Nov. 26, 2012

(65) Prior Publication Data

US 2014/0147275 A1    May 29, 2014

(51) Int. Cl.
*B64D 15/12*    (2006.01)
*B64C 11/02*    (2006.01)
*F03D 11/00*    (2006.01)

(52) U.S. Cl.
CPC ............... *B64D 15/12* (2013.01); *B64C 11/02* (2013.01); *F03D 11/0008* (2013.01)

(58) Field of Classification Search
CPC .. B60K 23/0808; B60K 3/04; F03D 11/0025; H02K 7/116; H02K 21/24; H02K 13/10; H02K 51/00; H02K 39/00–39/59; H02K 13/00; B64D 15/12

USPC ................................................ 416/95, 146 A
See application file for complete search history.

(56) References Cited

U.S. PATENT DOCUMENTS

| 4,386,749 A | 6/1983 | Sweet et al. |
| 5,634,800 A * | 6/1997 | Giamati .......................... 439/22 |
| 2010/0007151 A1 * | 1/2010 | Ciszak et al. ................... 290/55 |

FOREIGN PATENT DOCUMENTS

WO    WO 2011110429 A2 *    9/2011

* cited by examiner

*Primary Examiner* — Troy Chambers
*Assistant Examiner* — Joshua Semick
(74) *Attorney, Agent, or Firm* — Cantor Colburn LLP

(57) ABSTRACT

A propeller system for an aircraft includes a propeller assembly rotatable about a central axis and a reduction gearbox operably connected to the propeller assembly via a propeller shaft. An electrical power transfer system is positioned such that the gearbox is located axially between the electrical power transfer system and the propeller assembly. The electrical power transfer system includes a slip ring assembly secured to an oil transfer tube extending to the propeller assembly and a brush block interactive with the slip ring assembly to transfer electrical power to a plurality of lead wires extending from the slip ring assembly to the propeller assembly. The brush block is positioned such that brush block tips of the brush block extend toward the slip ring assembly in a substantially radial direction relative to the central axis of the propeller assembly.

10 Claims, 4 Drawing Sheets

ELECTRICAL POWER TRANSFER SYSTEM FOR PROPELLER SYSTEM

BACKGROUND OF THE INVENTION

The subject matter disclosed herein generally relates to propeller-equipped craft. More specifically, the subject disclosure relates to transfer of electrical power to propeller mounted components of the propeller-equipped craft.

A typical rotor or propeller equipped craft is often equipped with components at the rotating rotor such as deicing components, which require electrical power for operation. The deicing components typically include heating elements embedded into the propeller blades. Wires carry electrical power to the heating elements when deicing is required. The heating elements then melt accumulated ice and prevent subsequent formation of ice of the propeller blade surfaces. To transfer electrical power from the rotationally fixed airframe of the aircraft to the rotating propeller, a plate rotating with the rotor is provided and one or more slip rings are mounted to it. The rotating slip rings interfaces with a stationary brush block mounted to a front cover of a reduction gear box for the engine driving the propeller. In the aircraft, the brush block interfaces with a vertical face of the plate containing the slip rings forward of the gearbox. Leadwires from studs attached to the slip rings distribute electrical power to the various rotating components. Due to the necessary size of the slip rings, the presence of fluids and abrasive materials such as sand and dust in the brush block environment, a high level of wear occurs in the brush blocks carbon brushes and in the slip rings, resulting in excessive amounts of maintenance to repair and/or replace the brush block and slip ring components.

BRIEF DESCRIPTION OF THE INVENTION

According to one aspect of the invention, a propeller system for an aircraft includes a propeller assembly rotatable about a central axis and a reduction gearbox operably connected to the propeller assembly via a propeller shaft. An electrical power transfer system is positioned such that the gearbox is located axially between the electrical power transfer system and the propeller assembly. The electrical power transfer system includes a slip ring assembly operably connected to an oil transfer tube extending to the propeller assembly and a brush block interactive with the slip ring assembly to transfer electrical power to a plurality of lead wires extending from the slip ring assembly to the propeller assembly. The brush block is positioned such that brush block tips of the brush block extend toward the slip ring assembly in a substantially radial direction relative to the central axis According to another aspect of the invention, a deicing system for a propeller assembly includes a heating element operably connected to a propeller blade of the propeller assembly. A brush block is positioned such that a reduction gearbox operably connected to the propeller assembly is located between the brush block and the propeller assembly. A slip ring assembly is operably connected to a rotating element and is interactive with the brush block to transfer electrical power from the brush block assembly to the heating element via a plurality of lead wires extending from the slip ring assembly to the heating element. The brush block is positioned such that brush block tips of the brush block extend toward the slip ring assembly in a substantially radial direction relative to a central axis of the propeller assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
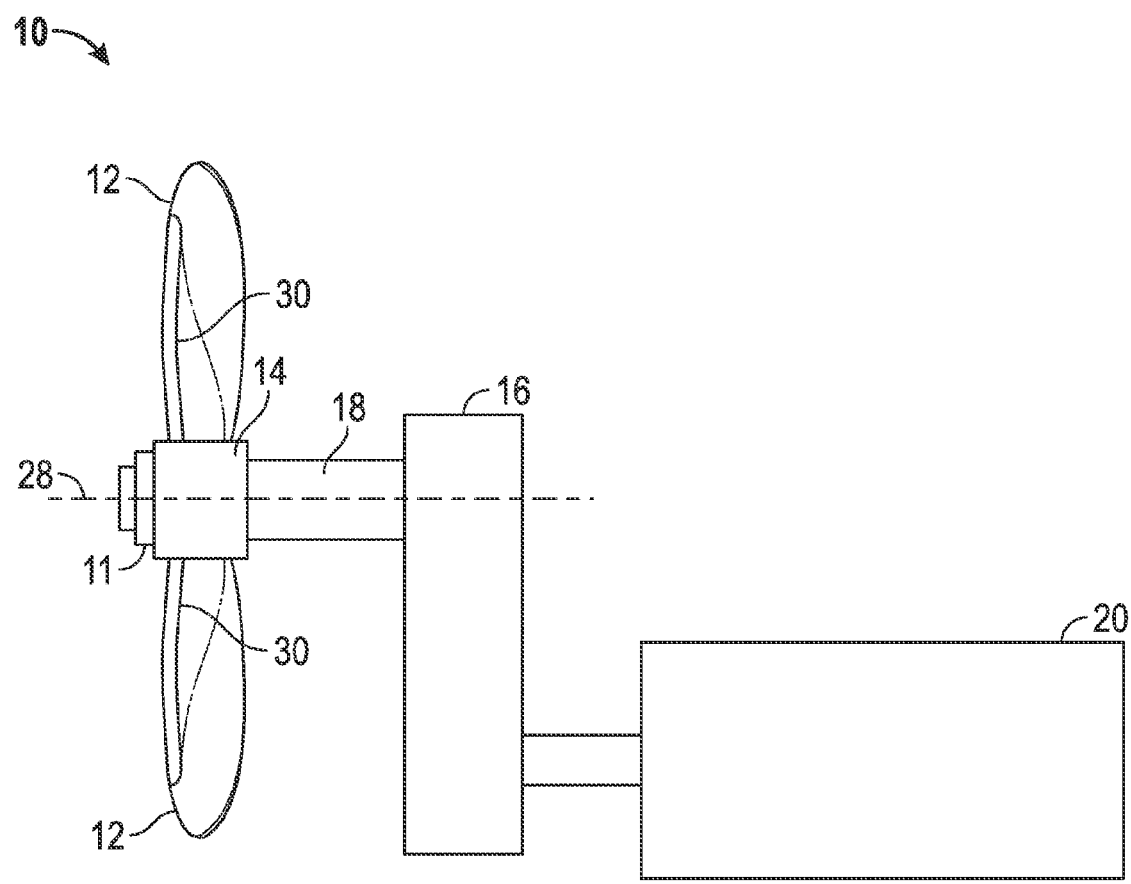
FIG. 1 is a schematic view of an embodiment of a propeller system.

Shown in FIG. 1 is a schematic view of an embodiment of a propeller system 10 for an aircraft. The propeller system 10 includes a propeller assembly having a plurality of propeller blades 12 arranged around a hub 14. A pitch change actuator 11 is connected to an end of the hub 14. The propeller blades 12 include one or more heating elements 30 for deicing of the propeller blades 12. The propeller system 10 is operably connected to a reduction gearbox 16 via a propeller shaft 18, which is in turn connected to an engine 20. The reduction gearbox 16 translates a rotational speed of the engine 20 into a selected propeller speed, $N_p$.

Figure 2:
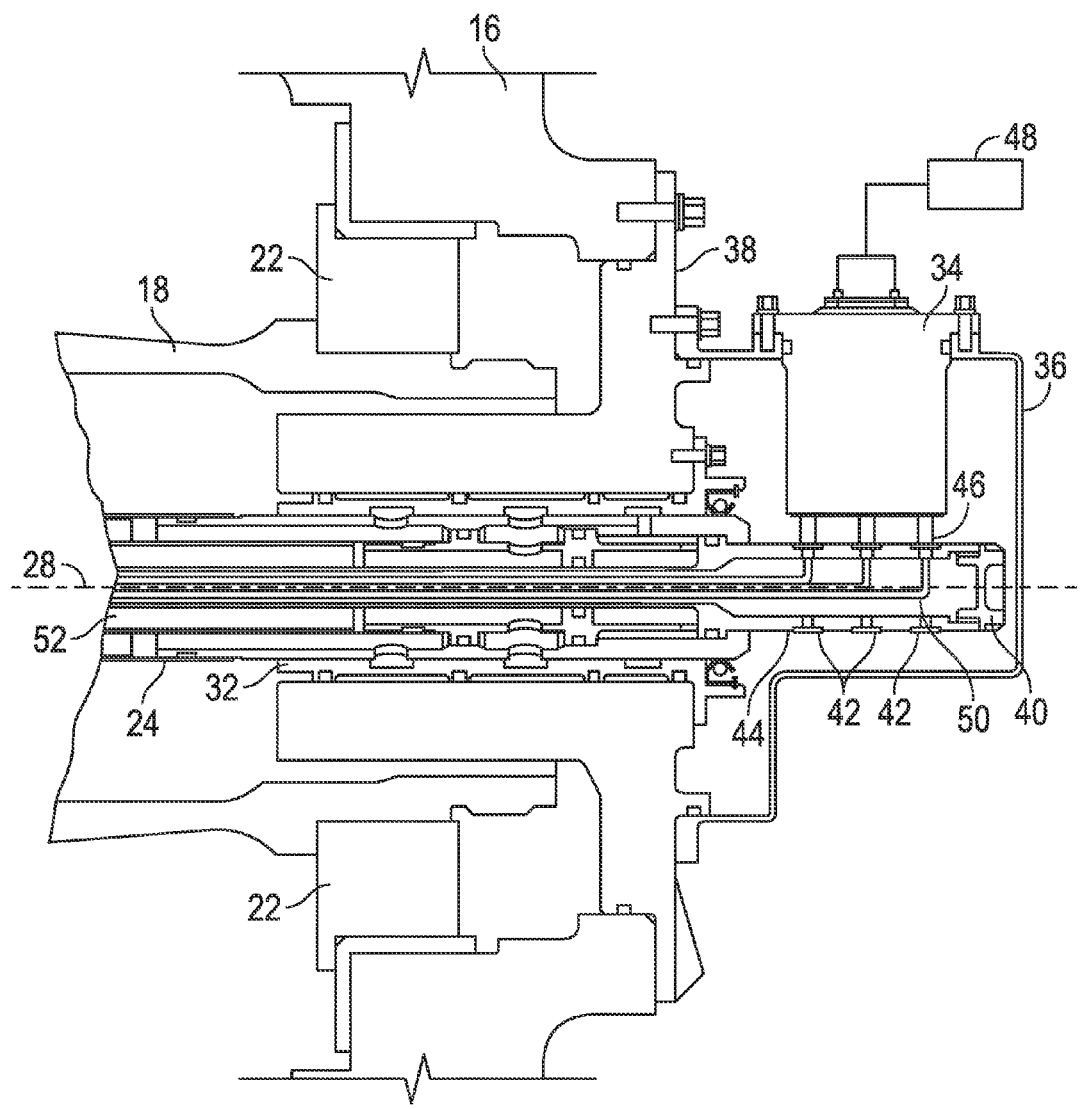
FIG. 2 is a cross-sectional view of an embodiment of a slip ring arrangement for a propeller system.

Referring now to FIG. 2, the propeller shaft 18 is supported by shaft bearings 22. Further, one or more tubes, for example, oil transfer tube 24 extend along shaft axis 28 toward the propeller blades 12. The oil transfer tube 24 is supported by the pitch change actuator 11 and interfaces with a transfer bearing 32 to provide fluid to the pitch change actuator 11 at the hub 14. A brush block 34 is located at an aft side of the gearbox 16, in other words the gearbox 16 is located between the propeller blades 12 and the brush block 34, relative to the shaft axis 28. The brush block 34 is at least partially supported by and enclosed in a brush block housing 36. In some embodiments, the brush block 34 is secured to an aft gearbox face 38.

In the embodiment of FIG. 2, the oil transfer tube 24 includes a slip ring assembly 40, including a number of slip rings 42 molded into or assembled to a slip ring tube 44. The slip ring tube 44 is concentric with and is secured to the oil transfer tube 24. In some embodiments, the slip ring assembly 40 includes three slip rings 42. The brush block 34 includes a number of brush block tips 46, which interface with the slip rings 42. The brush block 34 receives electrical power from a power source, for example, generator 48, and transfers the electrical power to the slip rings 42 via the brush block tips 46. In the embodiment of FIG. 2, the brush block tips 46 extend substantially radially relative to the shaft axis 28 toward the slip rings 42. The brush block tips 46 may be shimmed into a selected location relative to the slip rings 42. A number of lead wires 50 extend from the slip rings 42. The lead wires 50 are routed through a wire transfer tube 52 installed into the oil transfer tube 24. The wire transfer tube 52 rotates about the shaft axis 28 with the oil transfer tube 24 at $N_p$. The wire transfer tube 52 is isolated from oil flow through the oil transfer tube 24 to protect the lead wires 50 from damage due to the oil flow.

Figure 3:
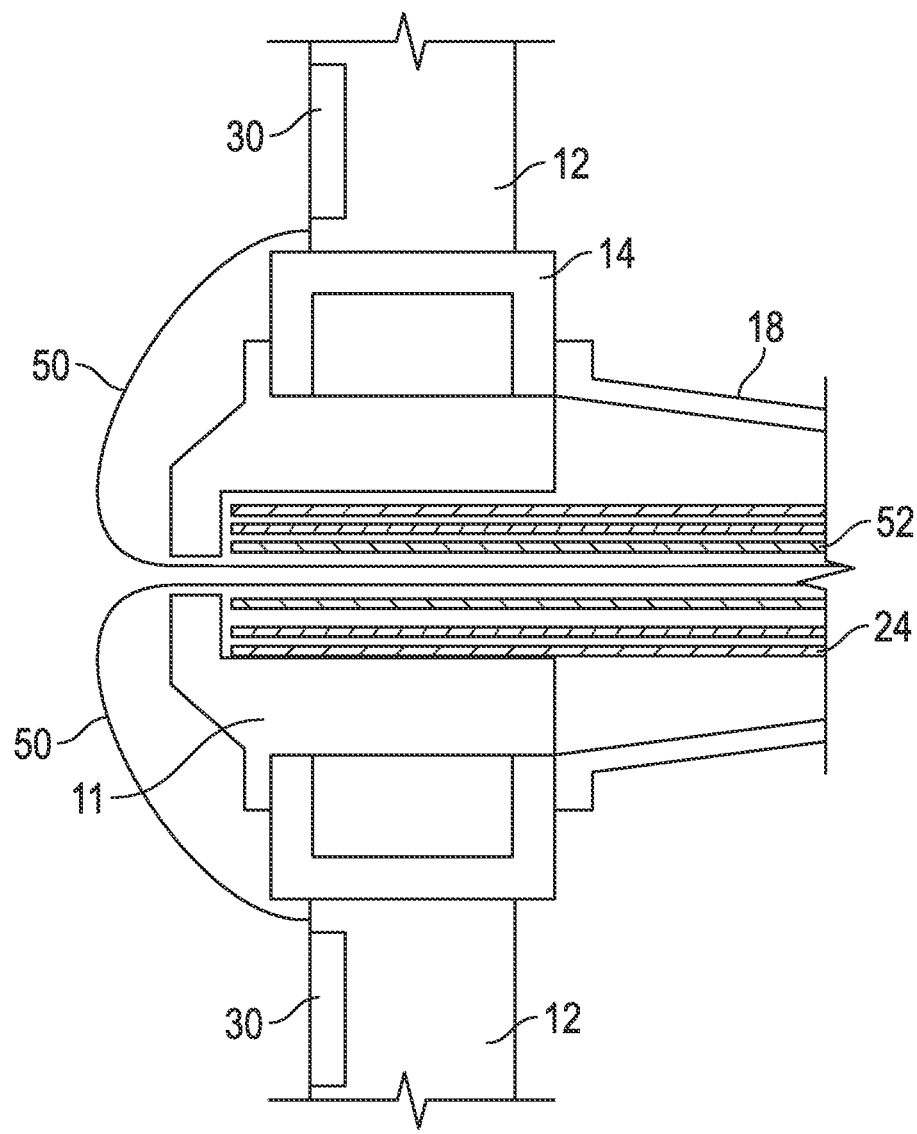
FIG. 3 is a schematic view of another embodiment of a propeller system.

As shown in FIG. 3, the lead wires 50 exit the wire transfer tube 52 at the hub 14 and are routed to the heating elements 30 to provide power thereto for deicing of the propeller blades 12.

Figure 4:
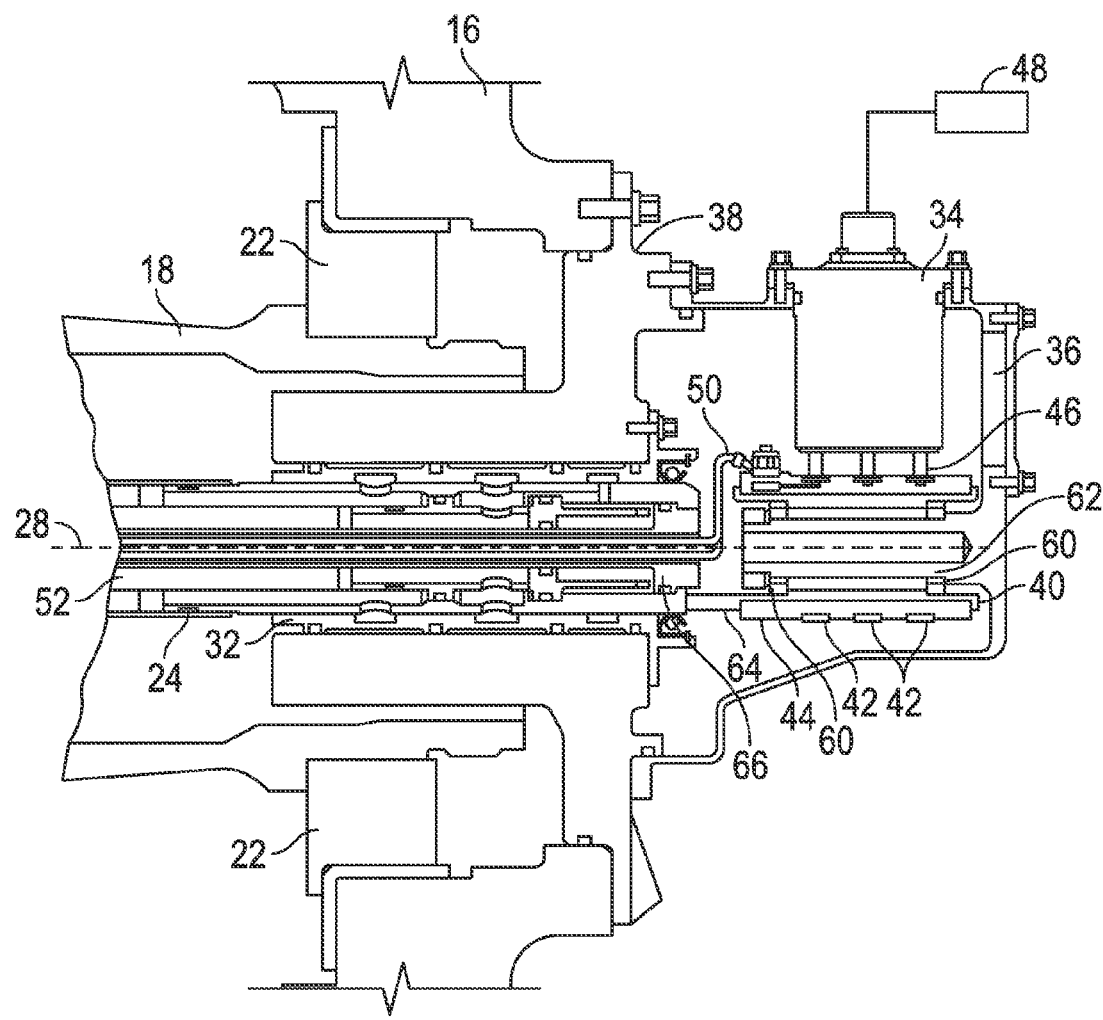
FIG. 4 is a cross-sectional view of another embodiment of a slip ring arrangement for a propeller system.

In another embodiment, shown in FIG. 4, the slip rings 42 are assembled to, or molded into the slip ring tube 44, which is supported by slip ring bearings 60 located at a support shaft 62 extending from the brush block housing 36 into an interior of the slip ring tube 44. The slip ring assembly 40 is operably connected to the oil transfer tube 24 via a slip ring drive tab 64 extending from the slip ring tube 44 to a drive notch 66 at the oil transfer tube 24. The connection is such that rotation of the oil transfer tube 24 drives rotation of the slip ring tube 44, and thus the slip rings 42.

Locating the slip ring assembly 40 and brush block 34 at an aft side of the gearbox 16 allows for a smaller slip ring plate or utilization of a slip ring tube 44 secured to the oil transfer tube 24. This results in smaller diameter slip rings 42 and thus lower rotational speed of the slip rings 42 at the slip ring 42/brush block tip 46 interface and less wear of the slip rings 42 and brush block tips 46. Further, location of the brush block 34 and slip rings 42 at an aft side of the gearbox 16 shields the brush block 34 and slip rings 42 from contaminants such as dust and sand, reducing erosion wear of the brush block 34 and slip rings 42.

Even though the system described herein is utilized for transfer of electrical power to deicing components of the propeller system 10, it is to be appreciated that the electrical power may be provided to the rotating portions of the propeller system 10 for other components such as propeller control systems, propeller dynamic balance systems, instrumentation systems for propeller testing, or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller system for an aircraft comprising:
    a propeller assembly rotatable about a central axis;
    a reduction gearbox operably connected to the propeller assembly via a propeller shaft; and
    an electrical power transfer system positioned such that the gearbox is located axially between the electrical power transfer system and the propeller assembly and including:
        a slip ring assembly operably connected to an oil transfer tube extending to the propeller assembly, the slip ring assembly comprises:
            a slip ring tube operably connected to the oil transfer tube via a slip ring drive tab;
            a slip ring bearing supportive of the slip ring tube; and
            a plurality of slip rings affixed to the slip ring tube; and
                a brush block interactive with the slip ring assembly to transfer electrical power to a plurality of lead wires extending from the slip ring assembly to the propeller assembly, the brush block positioned such that brush block tips of the brush block extend toward the slip ring assembly in a substantially radial direction relative to the central axis.

2. The propeller system of claim 1, wherein the slip ring assembly comprises:
    a slip ring tube affixed to the oil transfer tube; and
    a plurality of slip rings affixed to the slip ring tube.

3. The propeller system of claim 2, wherein the plurality of slip rings are molded into the slip ring tube.

4. The propeller system of claim 1, further comprising a wire routing tube disposed inside of the oil transfer tube, the lead wires routed through the wire routing tube.

5. The propeller system of claim 1, wherein the brush block is secured to an aft face of the gearbox.

6. The propeller system of claim 1, wherein the propeller assembly includes a plurality of propeller blades extending from a propeller hub operably connected to the propeller shaft.

7. A deicing system for a propeller assembly comprising:
    a heating element operably connected to a propeller blade of the propeller assembly;
    a brush block positioned such that a reduction gearbox operably connected to the propeller assembly is located between the brush block and the propeller assembly;
    a slip ring assembly secured to a rotating element and interactive with the brush block to transfer electrical power from the brush block assembly to the heating element via a plurality of lead wires extending from the slip ring assembly to the heating element, the brush block positioned such that brush block tips of the brush block extend toward the slip ring assembly in a substantially radial direction relative to a central axis of the propeller assembly;
    wherein the slip ring assembly comprises:
    a slip ring tube operably connected to an oil transfer tube disposed at a central axis of the propeller assembly via a slip ring drive tab;
    a slip ring bearing supportive of the slip ring tube; and
    a plurality of slip rings affixed to the slip ring tube.

8. The deicing system of claim 7, wherein the slip ring assembly comprises:
    a slip ring tube affixed to an oil transfer tube disposed at the central axis of the propeller assembly; and
    a plurality of slip rings affixed to the slip ring tube.

9. The deicing system of claim 8, wherein the plurality of slip rings are molded into the slip ring tube.

10. The deicing system of claim 8, wherein the brush block is secured to an aft face of the gearbox.

\* \* \* \* \*